US006844924B2

(12) United States Patent
Ruff et al.

(10) Patent No.: US 6,844,924 B2
(45) Date of Patent: Jan. 18, 2005

(54) LADAR SYSTEM FOR DETECTING OBJECTS

(75) Inventors: William C. Ruff, Baltimore, MD (US); Barry L. Stann, Edgewater, MD (US); Paul H. Shen, North Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/183,536

(22) Filed: Jun. 28, 2002

(65) Prior Publication Data

US 2003/0076485 A1 Apr. 24, 2003

Related U.S. Application Data

(60) Provisional application No. 60/301,428, filed on Jun. 29, 2001.

(51) Int. Cl.[7] ............................. G01C 3/08; G01P 3/36
(52) U.S. Cl. ................................... 356/5.09; 356/28.5
(58) Field of Search .............................. 356/5.01–5.15, 356/28.5

(56) References Cited

U.S. PATENT DOCUMENTS 4,611,912 A * 9/1986 Falk et al. ................. 356/28.5
5,020,901 A * 6/1991 de Groot
5,608,514 A * 3/1997 Stann et al. ............... 356/5.09
5,877,851 A * 3/1999 Stann et al. ............... 356/5.09

* cited by examiner

Primary Examiner—Bernarr E. Gregory
Assistant Examiner—Brian K Andrea
(74) Attorney, Agent, or Firm—William Randolph

(57) ABSTRACT

A high range resolution ladar includes a chirp generator for producing a chirp signal waveform that is used by a laser diode to propagate a divergent laser light waveform. The reflected light signals from the target are directed to a self mixing detector that is coupled to the chirp generator where the responsivity of the detector varies in accordance with the chirp waveform for converting reflected light signals from the target to electrical signals and for mixing the converted electrical signal with the chirp waveform to produce an output electrical signal whose frequency is proportional to the range to the target. The self-mixing detector includes at least one detector having a semiconductor substrate and first and second electrodes deposited on the substrate and spaced from each other, wherein the first set of electrodes is connected to the chirp generator and the second set of electrodes is connected to a memory for storing a plurality of frames of image data.

18 Claims, 9 Drawing Sheets

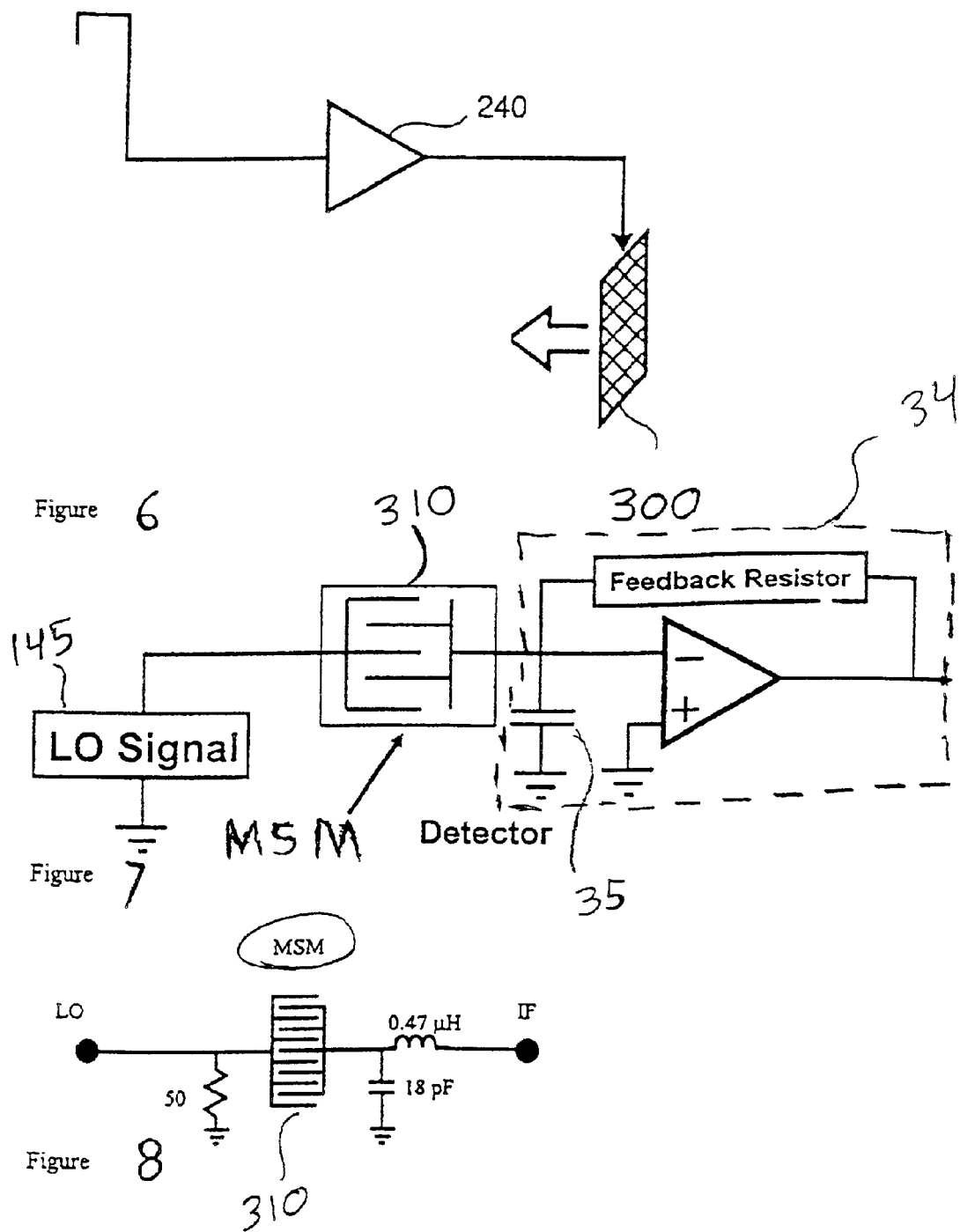

LADAR SYSTEM FOR DETECTING OBJECTS

CROSS-REFERENCE TO RELATED APPLICATIONS

The applicant's claim priority under 35 U.S.C. 119(e) for provisional application Ser. No. 60/301,428 filed Jun. 29, 2001 entitled "Ladar System For Detecting Objects", which is hereby incorporated herein by reference in its entirety.

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention generally relates to laser detection and ranging (ladar) systems; and more particularly, to an incoherent ladar which achieves high range resolution by employing self-mixing detectors in focal plane detector arrays.

BACKGROUND OF THE INVENTION

Use of ladar technologies to form images of targets is set forth in U.S. Pat. Nos. 5,608,514 and 5,877,851 assigned to the same entity, and herein incorporated by reference.

Ladar is basically a radar transformed from a system for measuring reflected radio frequency electromagnetic radiation, typically in the 1–25 cm wavelength range to locate remote objects, to a system that operates on laser radiation, typically in the 0.1 to 10.0 $\mu$m range. The resulting combination of radar and optics provides a system with inherently enhanced accuracy in the measurement of range, velocity, and angular displacement. Moreover, the high carrier frequency allows ladar systems to be made more compact in physical dimension, which is particularly attractive in aircraft, projectile, space and other volume-limited applications.

U.S. Pat. No. 5,608,514, (the '514 patent) issued Mar. 4, 1997 describes a technique for achieving high range resolution for a single pixel ladar by employing frequency modulation (FM) radar ranging principles.

Three-dimensional imaging of a scene is achieved by mechanically scanning the single pixel ladar or by building arrays of such ladars. To perform ranging on a single pixel, the ladar's laser transmitter is amplitude modulated with a radio-frequency subcarrier which itself is linearly frequency modulated. The target-reflected light is incoherently detected with a photodiode and converted into a voltage waveform.

The voltage waveform is then mixed with an undelayed sample of the original laser amplitude modulated waveform. The output of the mixer is processed to remove "self clutter" that is commonly generated in FM ranging systems and obscures the true target signals. The clutter-free mixer output is then Fourier transformed to recover target range.

The '514 patent teaches the use of a single pixel ladar and the use of a mechanical scanner to scan the laser output beam and the receiver or detected field of view to form an electronic image of the target. The development of a scannerless ladar generally requires building a receiver based-on some variation of focal plane array technology (FPA) such as used in conventional imaging cameras.

Another receiver design was conceived and disclosed in U.S. Pat. No. 5,877,851 (the '851 patent) where an electro-optic light modulator, positioned in the receiver light path, performs demodulation optically and a standard focal plane array performs detection of the demodulated light. Thus, while the laser transmitter is modulated as in the '514 patent, the entire scene or field of view is illuminated.

The method and apparatus of the '851 patent may be applied to both one-dimensional and two-dimensional detector arrays having any number of detectors. Numerous image frames are recorded periodically in time over a frequency modulation (FM) period. A Fourier transform taken over the time period for a pixel establishes the range to the target in that pixel. Performing the Fourier transform for all pixels yields a three-dimensional image of objects in the field of view. Using a focal plane detector array, electro-optical light modulator, and microwave circuit elements in conjunction with frequency modulated continuous wave (FM-/cw) radar ranging theory yields a scannerless ladar possessing high range resolution without range ambiguities.

While the ladar system of the '851 patent is scannerless, there are limitations. One limitation is that a separate electro-optic light modulator and a separate focal plane array are used to demodulate and detect the return or received light signal from the target. Further, the ladar approach of the '851 patent normally uses of a large area (i.e., 4×4 mm) QWEO modulator that is driven with the ladar's local oscillator voltage over the required bandwidth. The capacitive load presented by such a device is in the low 1000's of picofarads which may be difficult to drive using microwave amplifiers. The bandgap of the QWEO modulator and the laser line must remain coincident over temperature variations which adds to system complexity.

SUMMARY OF THE INVENTION

A high range-resolution ladar includes a chirp generator for generating a chirp waveform, a bias tee coupled to the chirp generator, a DC current source, and a semiconductor laser diode, where the bias tee sums the chirp waveform with the DC current source to produce a current drive for the semiconductor laser diode having a bandwidth at least equal to the chirp waveform. The semiconductor laser diode produces an optical laser light output signal that is directed toward a target. The optical light signal reflected from the target is collected by a self-mixing detector. The self-mixing detector is coupled to the chirp generator, where the responsivity of the self-mixing detector varies in accordance with the chirp waveform for converting the reflected light signal received from the target to an electrical signal and for mixing the converted electrical signal with the chirp waveform to produce an output electrical signal whose frequency is proportional to the range to the target. A memory device is coupled to the self-mixing detector for storing a plurality of frames of image data. Computing means is coupled to the memory for performing a discrete Fourier transform on the plurality of frames of image data and the results can be used to produce a 3-D image file.

A self-mixing detector comprises an optical detector which comprises a substrate, a first set of electrodes deposited on the substrate, and a second set of electrodes deposited on the substrate and spaced from the first set of electrodes. The first set of electrodes is connected to the chirp generator and the second set of electrodes is connected to the memory for storing a plurality of frames of image data. The reflected light signal from the target impinges onto the substrate and electrode material where it is converted into an electrical signal. The converted electrical is mixed with the chirp waveform to produce an output electrical signal whose frequency is proportional to the range to the target. The output electrical signals are fed to the memory device.

The above brief description sets forth rather broadly the more important features of the present invention in order that the detailed description thereof that follows may be better understood.

Accordingly, one object of the present invention to provide an incoherent ladar system which is of self-contained, efficient design that is capable of high resolution and target imaging.

Another object of the present invention is to provide a relatively simple detection method and apparatus which can be readily adapted to ladar technology to form a three-dimensional image file of a target.

It is another object of the present invention to provide a ladar method and apparatus of reliable design that can be efficiently assembled for detecting remote targets.

A further object of the present invention is to provide an incoherent ladar system having an improved signal to noise ratio and high range resolution achieved by using self-mixing detector.

Yet another object of the present invention is to provide a ladar method and apparatus for removing false targets and which utilizes detectors that produce low self-clutter signals.

Another object of the present invention is to provide a self-mixing detector to achieve unambiguous high range resolution using frequency modulation (FM) radar techniques that involve frequency modulation of a radio frequency subcarrier to amplitude modulate the light output of a semiconductor laser.

The above and still further objects, features and advantages of the present invention will become apparent upon considering the following detailed description of the invention and specific embodiments thereof, particularly when viewed in conjunction with the accompanying drawings wherein like reference numerals in the various figures are utilized to designate like components.

BRIEF DESCRIPTION OF THE DRAWINGS

Other objects and advantages of the invention will become apparent upon reading the following detailed description with reference to the attached drawings, wherein:

FIG. 6 is a depiction of a self-mixing detector assembly of FIGS. 4 and 5;

FIG. 7 is a representation of the detector circuit of FIGS. 4 and 5;

FIG. 8 is a diagram of a detector and its supporting microwave circuitry;

FIGS. 16 through 18 show other detector designs formed of metal-semiconductor materials.

DETAILED DESCRIPTION OF THE INVENTION

Figure 1:
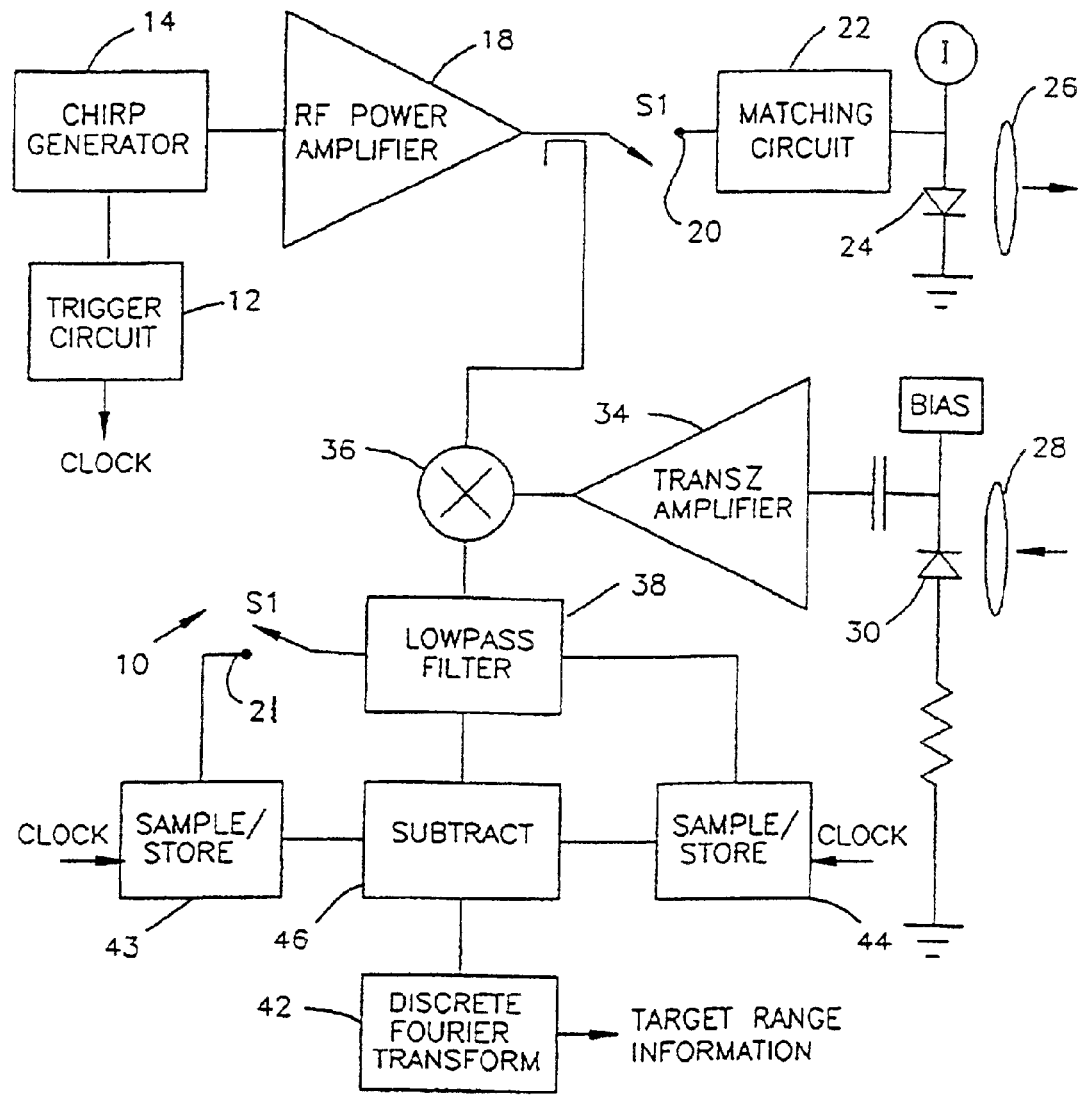
FIG. 1 is a block diagram of a prior ladar architecture.

Referring now to FIG. 1 of the drawings, there is generally shown a block diagram of a ladar architecture disclosed in U.S. Pat. No. 5,608,514 ('514 patent). The architecture includes a trigger circuit 12 which activates a chirp generator 14 for producing a signal with a frequency that increases linearly as a function of time over a period of time, T. The chirp signal is fed through a wideband RF power amplifier 18 to a matching circuit 22 that matches the driving impedance of the amplifier to the impedance of a laser diode 24.

Laser diode 24 converts the chirp current waveform into a light waveform with power proportional to the driving current. This divergent laser light beam is collected by a first lens 26, collimated and directed toward a target. The small portion of transmitted light that is reflected by the target and propagated back to the ladar is collected by a second lens 28 and focused onto the active detection region of a photodiode 30. Photodiode 30 converts the collected incident light into a current waveform with the amplitude proportional to the power of the recessed light, thus recovering a current waveform identical to the original modulating waveform except for an amplitude reduction and time delay equal to the propagation time from the sensor to the target and back. Output current from photodiode 30 is converted into a voltage waveform by a wideband trans-impedance amplifier 34. The amplified voltage waveform is fed into a mixer 36 along with an undelayed sample of the original transmitted chirp waveform. The mixer output is fed into lowpass filter 38 to recover an intermediate frequency (IF) signal.

A subtraction technique, implementable with modem analog-to-digital converters, memory chips and microwave switches is designed to eliminate self-clutter problems. Referring to the block diagram of FIG. 1, a first switch 20 is opened to interrupt the transmission of light to the target, therefore leaving only the self-clutter signal present at the lowpass filter output. A second switch 21 connects lowpass filter 38 to a first sample-and-store memory circuit 43. When second switch 21 is closed, the clutter signal is directed into first sample-and-store memory circuit 43. For subsequent chirp periods, first switch 20 is closed and second switch 21 is open. The total IF signal is then sampled and stored in a second sample-and-store memory circuit 44. The clutter signal from first sample-and-store memory circuit 43 and the total IF signal from second sample-and-store memory circuit 44 are simultaneously fed into a subtracting circuit 46 where the self-clutter signal is subtracted from the total IF signal on a chirp by chirp basis leaving only the IF signal. The differential output is fed into Fourier transform circuitry 42 to map the received time domain IF signal into the frequency domain or, equivalently, the range domain, to indicate the distance to the target. The updating rate of the stored self-clutter signal is based on the rate of change of the self-clutter signal and the degree of cancellation required to meet ladar sensitivity requirements. In other words, the operation of switches 20 and 21 can be performed as often as required to assure that the self-clutter signal in first sample-and-store memory circuit 43 is constantly updated to reflect current conditions. As indicated earlier, the self-clutter signal is usually fairly unvarying but the capability to check and update provides added reliability. Self-clutter signals as high as 60 dB above the target signal can be successfully subtracted according to the technique of the present invention using 12-bit analog-to-digital converters.

Figure 2:
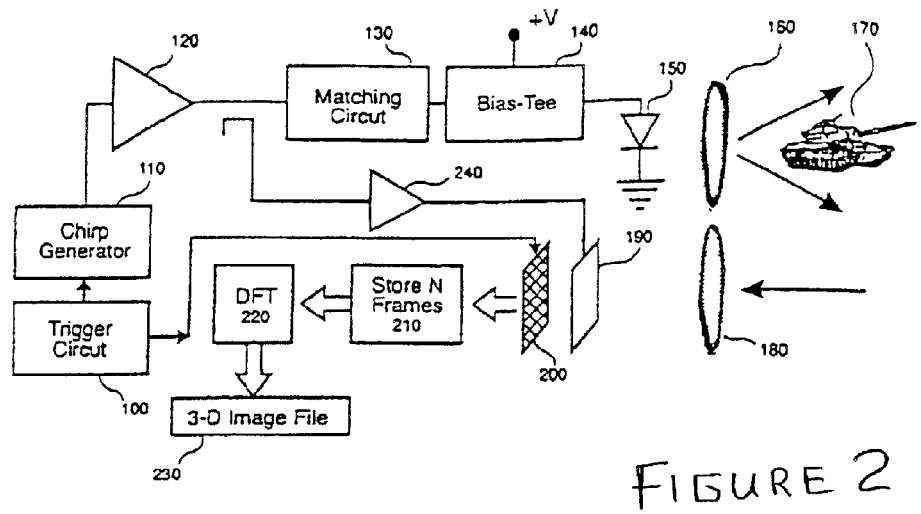
FIG. 2 is an electronic block diagram of another prior ladar architecture.
Figure 3:
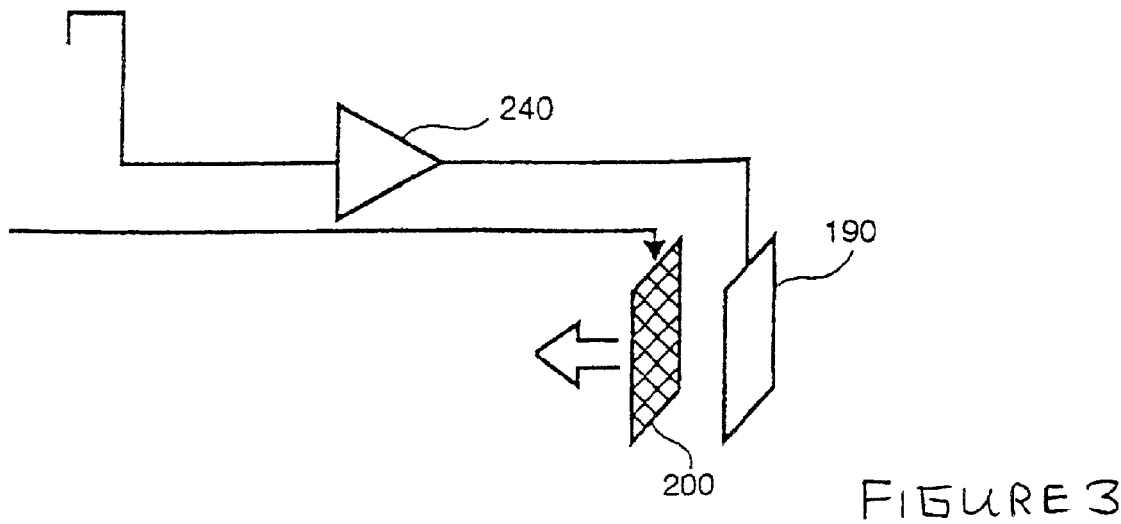
FIG. 3 is a diagram of the electro-optic modulator and focal plane detector array of FIG. 2.

Referring now to FIG. 2, there is shown an electronic block diagram of the ladar architecture disclosed in U.S. Pat. No. 5,877,851 ('851 patent). This ladar system captures high angular resolution and high range resolution images of target scenes without the need for mechanical scanning of the ladar's laser or receiver beams, as with the ladar system of U.S. Pat. No. 5,608,514. This was accomplished with focal plane detector arrays, frequency modulation (FM) radar ranging principles, and electro-optic light modulators (a class of devices including gain-modulated image intensifiers, and quantum-well electro-optic light modulators). In FIG. 2, trigger circuit 100 initiates generation of a linear frequency modulated sinusoidal chirp signal in chirp generator 110. The chirp signal will persist for some period, T. A chirp signal is simply a sinusoidal waveform whose frequency linearly increases over T. Other modulation waveforms may also be used.

In FIG. 2, the chirp signal is fed into a wideband radio frequency (rf) power amplifier 120 which modulates the current driving semiconductor laser diode 150. Wideband matching circuit 130 between wideband rf power amplifier 120 and semiconductor laser diode 150 matches the driving impedance of wideband rf power amplifier to semiconductor laser diode 150 over the modulation bandwidth. Matching the driving impedance of the amplifier causes the light beam intensity to be highly amplitude modulated (AM) and causes the peak intensity to be constant as a function of chirp frequency. Output from wideband matching circuit 130 and a DC current (+V) are summed in bias tee 140 to provide the current drive for semiconductor laser diode 150 with a bandwidth at least equal to the chirp waveform.

The divergent laser beam from semiconductor laser 150 is collected by a lens 160 which collimates the light in a beam sufficiently wide to encompass or floodlight the target scene of interest 170. A small portion of the laser light is reflected from target 170 back toward the ladar and collected by lens 180. Electro-optic light modulator 190 is driven by the original laser modulation waveform by tapping off a portion of the output of wideband radio frequency (rf) power amplifier 120 and amplifying the signal through amplifier 240. Electro-optic light modulator 190 is located in the light path somewhere between lens 180 and focal plane detector array 200.

Electro-optic modulator 190 modulates (mixes) the received light from the target with the original chirp signal and the mixed light signal is then focused onto focal plane detector array 200. Each photo-detector element in focal plane detector array 200 converts incident light power into an electric charge proportional to the integral of the light power taken over the sampling time of the array. Thus, modulator 190 multiplies the optical signal from the target with the chirp waveform and passes the modulated optical signal to an optical detection array where it is converted into an electrical signal.

Amplifiers within focal plane detector array 200 convert the electric charge to produce a voltage proportional to the light energy. This voltage was shown to represent a sample of the intermediate frequency (IF) waveform normally recovered in frequency modulation (FM) radar systems. To collect a full IF waveform, focal plane detector array 200 collects data periodically along the chirp period and sends it to memory 210. The data set in memory 210 contains, for each pixel, an intermediate frequency (IF) waveform which includes all of the magnitude, range, and phase information derived from the light reflected from scatterers in that pixel.

After the chirp period (T), the dimensional data set in memory 210 is passed to a signal processor 220 which computes the range or forms range cells by performing the Discrete Fourier Transform (DFT) on the time signal resident in each pixel. The transformed data set is a three-dimensional image file 230 of the original illuminated scene.

Figure 4:
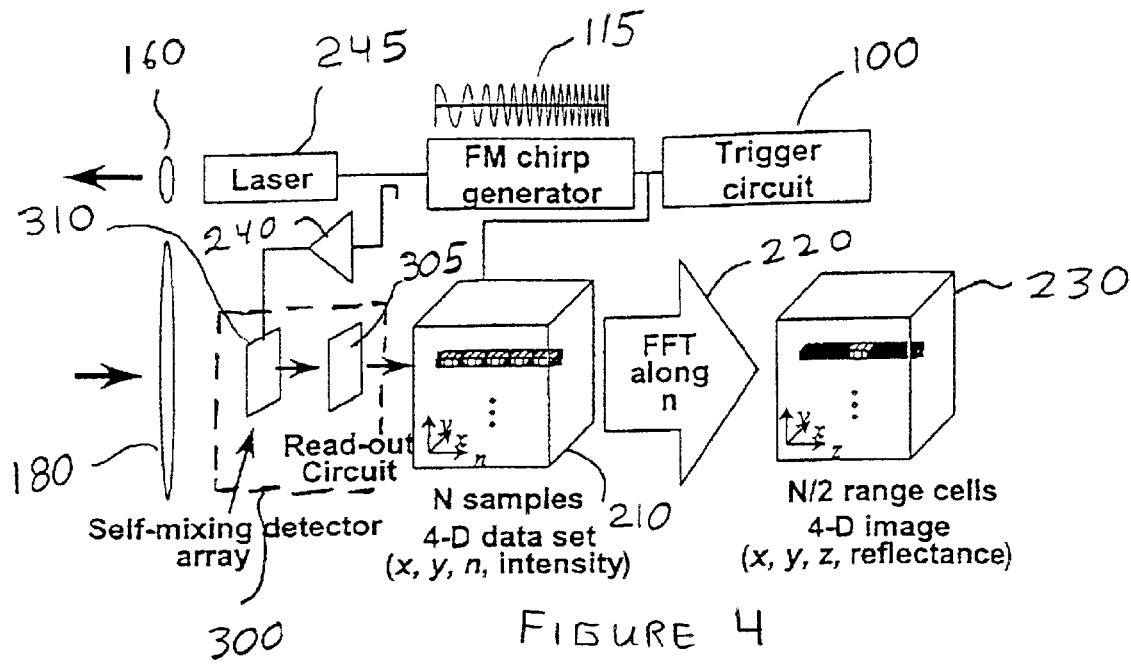
FIG. 4 is an electronic representation of the ladar architecture of the present invention.
Figure 5:
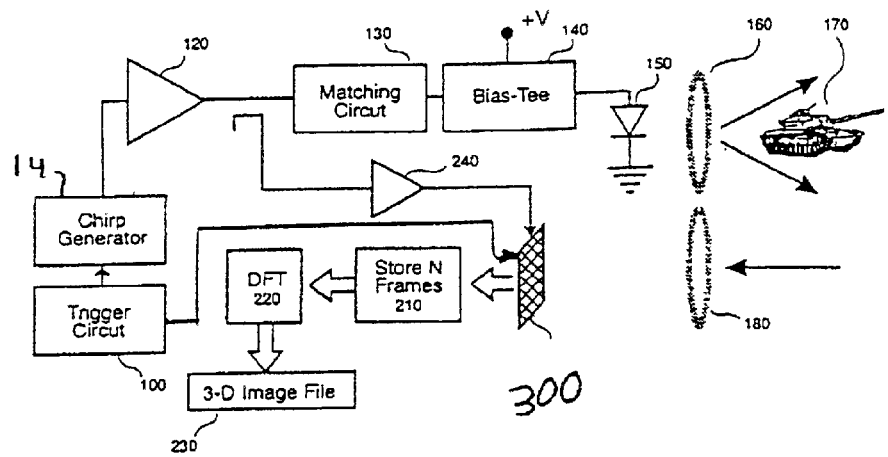
FIG. 5 is a block diagram of the ladar architecture of FIG. 4.

Referring now to the present invention disclosed in FIGS. 4 through 18, there is generally disclosed a ladar system which utilizes a self-mixing detector assembly comprising a metal-semiconductor-metal (MSM) detector. FIG. 4 is a representation of the ladar system of the present invention and FIG. 5 is a block diagram of the present invention. In FIG. 4, the laser function 245 comprises amplifier 120, matching circuit 130, bias tee 140, and laser diode 150, separately shown in FIG. 5. Also in FIG. 4, the MSM detector array function and the read-out circuit function are represented by a single unitary device, a self-mixing detector 300, which is also shown in FIG. 5. In FIGS. 4 and 5, a trigger circuit 100 initiates the generation of a sawtooth chirp signal that serves as the laser modulation and local oscillator signal. This chirp signal 115, as shown in FIG. 10, is simply a sinusoidal waveform whose frequency linearly increases over a period. The chirp signal 115, for example, may have a start frequency in the tens to low hundreds of megahertz and a stop frequency in the hundreds of megahertz to low gigahertz. Other modulation waveforms, such as triangle waves (i.e., contiguous rising and declining chirps), short pulses, and psuedo-random code modulations, are usable with appropriate variations to the ladar signal-processing stages. To simplify discussion of the ladar architecture, we use only the sawtooth modulation format, which yields high range resolution with a minimum amount of ladar complexity.

To modulate the laser illumination, the chirp signal 115 is fed to a wideband rf power amplifier 120 with a low output driving impedance. Output from the amplifier 120 and the DC current are summed in a bias tee 140 to provide a modulated current drive for a semiconductor diode laser 150 with a bandwidth at least equal to the bandwidth of the chirp waveform. A high-percentage amplitude modulation of the light beam is desirable. The divergent laser beam from the semiconductor laser is collected and focused with lens 160 to project a beam sufficiently wide to encompass or floodlight the target scene 170 of interest. In general, different laser light sources can be used which can be that amplitude-modulated to a wide bandwidth (typically 1 GHz satisfies many applications) and produce high power (usually 0.1 W or greater depending on range, number of pixels in the focal plane, signal-to-noise requirements, and other factors) either continuously or in bursts lasting, for example, of from about 200 ms to about 50 us. Examples of sources include single broad-area semiconductor diode lasers and banks of semiconductor diode lasers where the outputs are combined. Other sources include oscillator-amplifier systems where a low power diode laser is amplitude-modulated and used to drive an amplifier. Also, experimental oscillator-amplifiers have been built on a single substrate analogously to the broad-area lasers. Another promising oscillator-amplifier system uses a low-power fiber-coupled diode laser that is used to drive an Erbium fiber amplifier. Such amplifiers can generate 10 W of continuous output.

Figure 15:
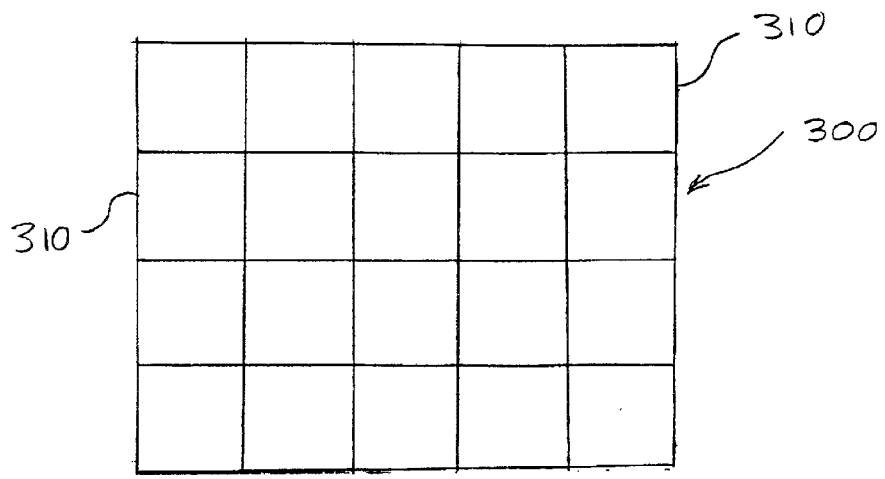
FIG. 15 shows an array formed of a plurality of detectors.
Figure 13:
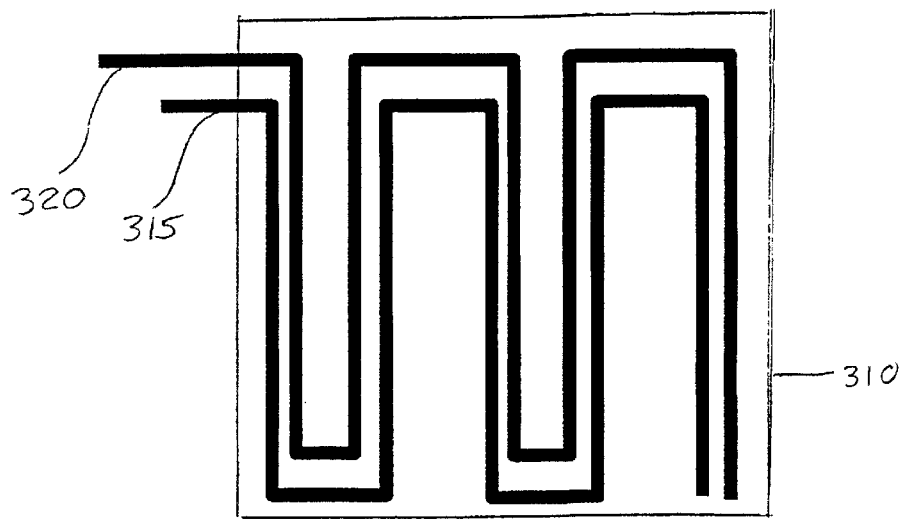
Figure 14:
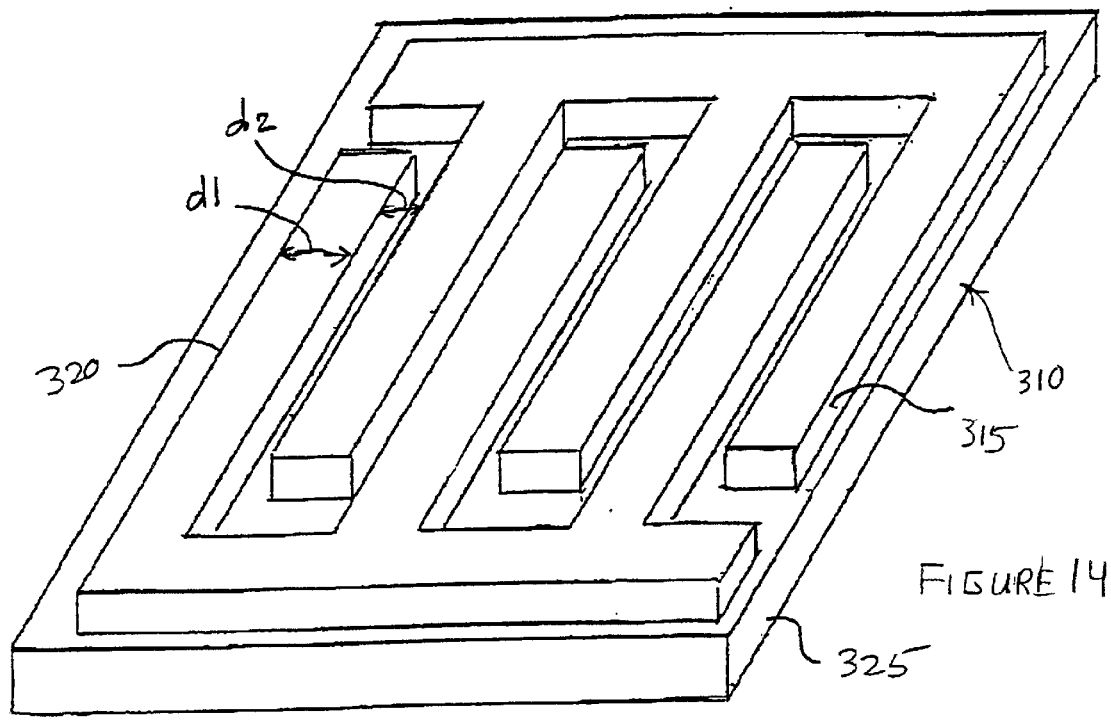
FIG. 14 shows one design of a detector formed of metal-semiconductor materials.

A small portion of the transmitted beam is reflected from the target 170 back toward the ladar and collected by the receiver optics 180. A self-mixing detector assembly 300, such as formed of an array of metal-semiconductor-metal (MSM) detectors 310, is located at the focal plane of the receiver optics 180. When the transmitter modulation waveform (local oscillator (LO)) is applied to a metal-semiconductor-metal or MSM detector 310, as shown in FIG. 14, a photo-current response is recovered at each MSM detector 310 arranged in an array 312, as shown in FIG. 15, that is the product of mixing the LO waveform and the modulated light waveforms. For a sawtooth modulation of the present invention, the instantaneous transmitted and received chirp waveforms differ in frequency (by $f_{if}$) because of the chirp and the round-trip light propagation time ($\tau$). Mixing in the MSM detector array 312 produces a sinusoidal photo-current at $f_{if}$ (IF waveform), as shown in the bottom of FIG. 10, that can be sampled by conventional read-out circuits.

The IF waveforms from the array 312 of metal-semiconductor-metal detectors or MSM detectors 310 of the self-mixing detector array 300 are then fed into a read-out circuit 305. The read-out circuit as represented in FIG. 4 and which is included in the self-mixing detector assembly 300 collects the IF signals from the detectors in the array and transmits the signals to a memory 210. Although many architectures exist for read-out circuits, a common feature is an amplifier circuit for each pixel or MSM detector, such as the transimpedance amplifier 34 design. Outputs from each of these amplifiers are sampled and then time-multiplexed on to a signal buss that connects to other signal storage or processing devices remote from the detector array. Multiplexing of the detector signals by time or other means is required because otherwise the number of individual wires leading from each detector in the array to the offboard devices would be prohibitive. This process is repeated periodically over the chirp period at a rate adequate to sample the highest expected IF. The resulting data set in memory contains, for each pixel or MSM detector, the IF waveform that includes all the magnitude, range, and phase information derived from the light reflected from all targets or scatterers in that pixel. To explain how the IF waveform is processed for extracting range information, we give a summary of FM ranging theory for sawtooth FM modulation in the following text. The mean frequency $f_{if}$ of the IF waveform is given by $$f_{if}=(\Delta F/T)\tau,$$

where $\Delta F$ is the difference between the start and stop frequencies of the chirp signal. This equation follows from standard FM radar ranging theory and can be derived by a geometrical examination of FIG. 10. The expression for the propagation time ($\tau$) is $$\tau=2D/c,$$

where D is the distance from the sensor to the target and c is the velocity of light. Substituting this expression into the equation for $f_{if}$ yields $$f_{if}=(2\Delta F/c)(D/T)$$

which shows that the frequency of the IF waveform is directly proportional to the range to the target. From this it follows that the discrete Fourier transform performed over the IF waveform in each pixel will establish the range to all targets or scatterers in the pixel and the respective magnitude and phase of the target's signal. The intrinsic resolution of the ladar $\Delta R$ (i.e., the minimum distance between two separate targets that can be resolved) is equal to $$\Delta R=c/2\Delta F.$$

The ladar system of the present invention possesses several advantages that could support its use for various applications. For one, it illuminates the scene with semiconductor diode lasers, which are low-cost, rugged devices comparable to those mass produced for applications such as fiber optic communications, bar code scanners and CD disk players. Additionally, because the ladar employs FM/cw ranging principles, it can achieve 0.25 m or less range resolution with minimum use of microwave circuitry. While many ladar systems detect one target in a single pixel, the ladar system of the present invention is a linear system and thus can detect multiple targets in a pixel. For this reason, the ladar system of the present invention is able to form high quality images in cases where targets may be surrounded by thin foliage.

An example of a "self-mixing" detector design is a metal-semiconductor-metal (MSM) detector, as shown in FIG. 14. The metal-semiconductor-metal detector comprises a series of inter-digitated metalized electrodes deposited on an undoped semiconductor substrate. The preferred detector is essentially an n++-i-n++ type device with the metal chosen such that the metal-to-semiconductor interface forms a Schottky barrier diode.

Figure 9:
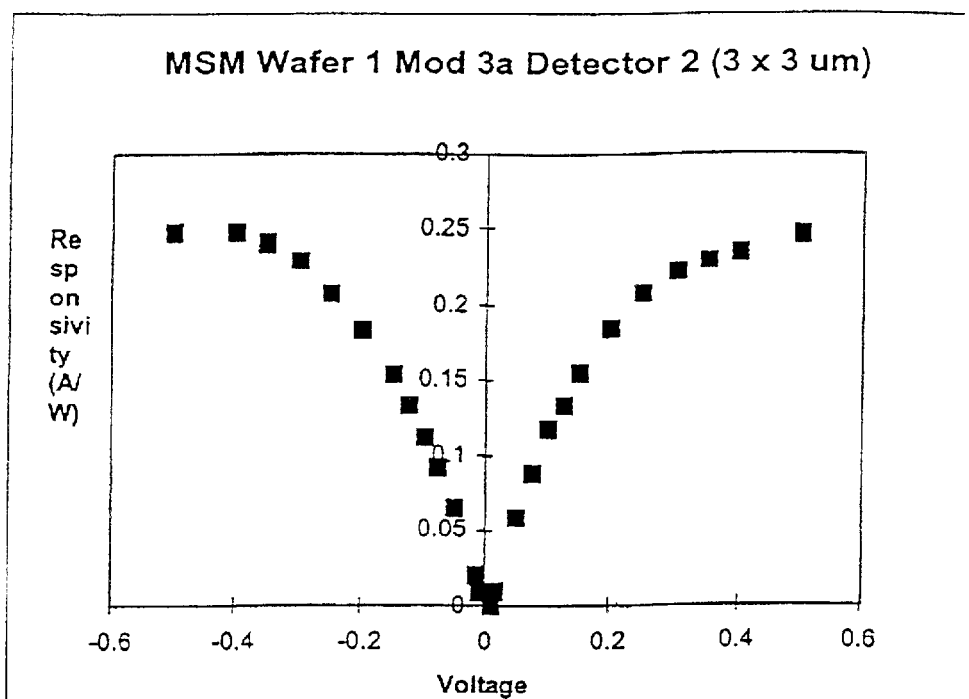
FIG. 9 is a plot of the responsivity versus voltage for a detector.
Figure 10:
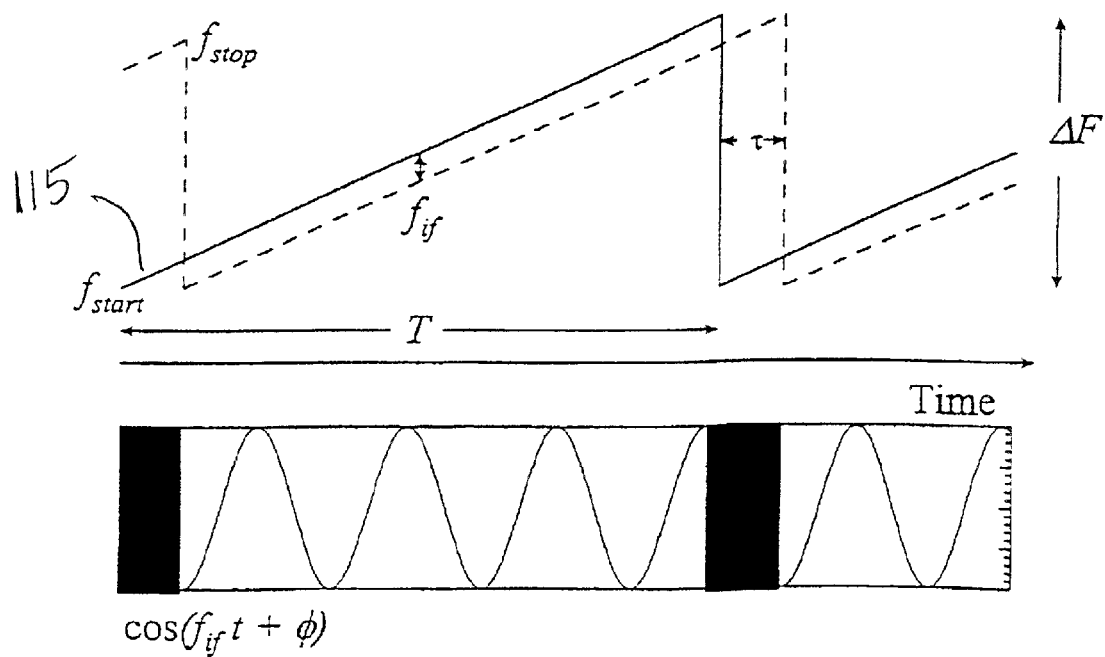
FIG. 10 is a diagram depicting one example of a FM/cw ranging waveform for the ladar architecture used with the present invention.
Figure 11:
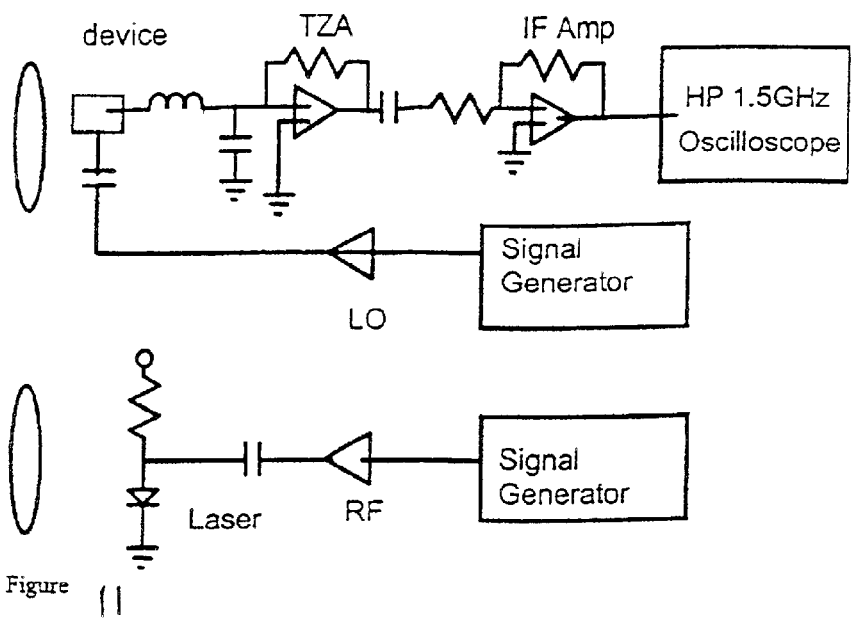
FIG. 11 is a measurement test set-up for evaluating a self-mixing detector.

The device exhibits a voltage variable responsivity, as shown in FIG. 9, which can be modulated at rf frequencies to achieve mixing of the modulated light and the applied LO voltage to generate the IF waveform previously discussed. The current MSM detector designs operate at a wavelength of about 0.8 $\mu$m and are built on undoped GaAs substrate. Other material systems such as InGaAs are used to obtain operation at longer light wavelengths. Such MSM detector designs require grown material specifically engineered to achieve acceptable responsivity, bandwidth, and low noise performance. Nonetheless, the desired operating modes, parameters and characteristics of detectors at other wavelengths should be similar to the 0.8 $\mu$m designs to attain good ladar performance. For simplicity, the following text only discusses the performance of the 0.8 $\mu$m detector.

Figure 16:
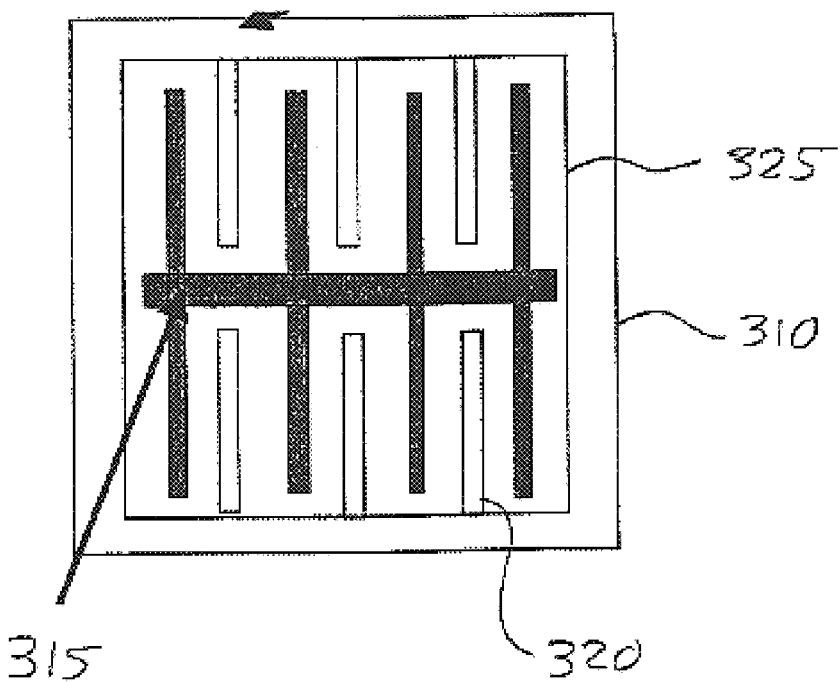
Figure 17:
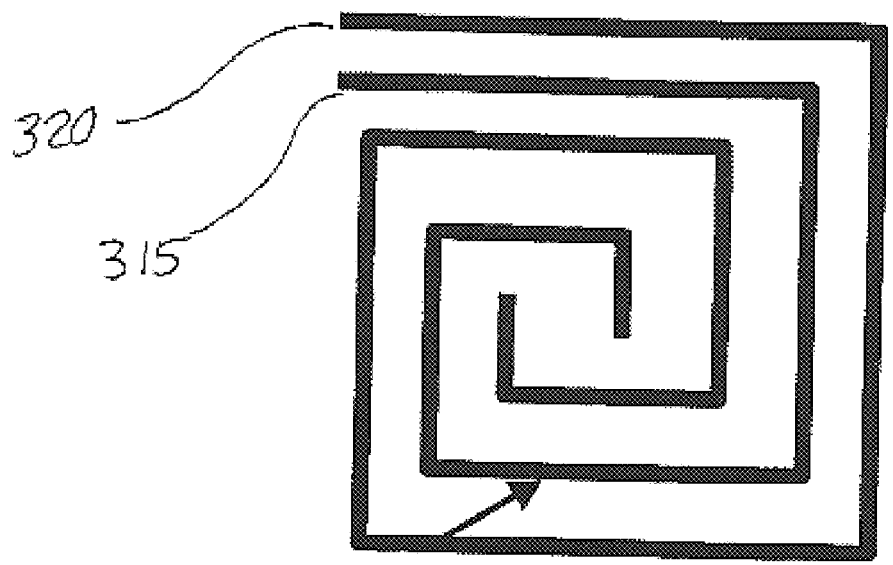

A preferred circuit for operating a metal-semiconductor or MSM detector 310 is shown in FIG. 7. Here the LO voltage 145 developed by the chirp generator 34 is applied to one set of fingers of the MSM detector, such as electrode 315 in FIG. 14, while the other set of fingers of the MSM detector, such as electrode 320 in FIG. 14, is AC grounded through a capacitor 35 of the transimpedance amplifier 34. The mixed photo-current is fed into a transimpedance amplifier which converts the current into a voltage. FIGS. 16 through 18 show other configurations of MSM detectors generally comprising spaced metal electrodes bonded or otherwise attached to a semiconductor substrate, where the metalization patterns are closely spaced (such as 1–10 $\mu$m) from each other. FIGS. 14 and 16 show patterns of interdigitated finger designs; FIG. 17 shows a spiral design; and FIG. 18 shows a serpentine design.

Ideally the detector is modeled as identical back-to-back Schottky barrier diodes and, thus will have equal impedances for positive and negative LO voltages. Balanced impedances for both LO polarities causes any current induced by a zero-mean LO to average to zero at the output of the transimpedance amplifier. This is especially desirable from a ladar systems standpoint because currents induced by impedance unbalance may appear as false targets at the output of the ladar's signal processor. An important benefit, is that with a zero mean LO voltage applied, the detector has no average response to background light because the photo-current current flows equally positively and negatively for each half cycle of the LO voltage. Thus, care is taken in the design and processing of the detectors to achieve balanced operation.

In general, MSM detectors have a very low driving impedance. For example, a MSM detector that is 250 $\mu$m square has a capacitance of 0.4 picofarads which is in the 100's of ohms at microwave frequencies. For array applications, the detectors can be made considerably smaller which drives down the capacitive load per device, thus small arrays and portions of large arrays can be driven with the LO without much difficulty. Additionally, these detectors require only 1.0 $V_{pp}$ of LO voltage for maximum IF signal; this also reduces the complexity and cost of the driving microwave amplifier. At these LO levels, the detectors have measured IF signal bandwidths in excess of 500 kHz and responsivities of about 0.125 A/W where the rf bandwith is in excess of 1300 MHz. Over a full chirp (100–700 MHz), the MSM detectors had a reasonably flat IF voltage response with no obvious distortion in the IF signal. Additionally, impedance balance of the detectors was sufficient to cause little induced signal from self-detection of the LO signal.

In general, the metal-semiconductor-metal or MSM detector 310 of FIG. 14 is a photo-detector formed by laying two conductive, inter-digitated electrodes 315 and 320 on the surface of an undoped semiconductor substrate 325. Charge carriers created by light incident on the exposed semiconductor are collected with the electrodes. FIG. 14 shows a plurality of inter-digitated electrodes or fingers 315 and 320 where the finger width (d1) and finger spacing (d2) of the electrodes largely determine the device characteristics, such as responsivity, bandwidth, and inter-electrode capacitance. Because of the low inter-electrode capacitance, MSM detectors are capable of detecting multi-GHz amplitude-modulated optical signals. A characteristic of particular importance for ladar applications is a voltage-variable responsivity that can be modulated at microwave frequencies to mix or down-convert light signals that are amplitude modulated at microwave frequencies.

A simplified mathematical analysis of the self-mixing detector's mixing function and a summary of data collected on MSM detectors built at 0.8 $\mu$m to illustrates the characteristics required for optimum FM/cw ladar performance. While self-mixing detectors built for other wavelengths may use other material systems and epitaxially grown material, the detectors must behave similarly to the MSM design described herein to be useable in the FM/cw ladar.

The MSM detector can be modeled as a three-port device. One port is the semiconductor surface that is illuminated with the incident light, a second port is one electrode that is excited with the LO voltage, and a third port is the second detector electrode which recovers the detector mixing product. A simplified circuit diagram for operating the MSM detector as a three-port device is shown in FIG. 7. Here a capacitor bypasses the LO signal on the second electrode to ground and allows only the low frequency mixed signal into the following transimpedance amplifier. As mentioned, mixing of the modulated incident light is accomplished by applying the LO voltage across its two electrodes thus modulating the detector responsivity. From the experimental responsivity data shown in FIG. 9, for small LO voltage swings around zero, the responsivity, R(v) can be represented as, $$R(v) = m_d v$$

where v is the LO voltage and $m_d$ is simply the slope of the responsivity around zero volts. The photo-current is then $$i_d = R(v) P_{lo}$$

where $P_{lo}$ is the incident light power. If sinusoidal signals at $\omega_{rf}$ and $\omega_{lo}$ are applied to the incident light and the detector LO voltage, respectively, and a solar background power $P_b$ is added, the detector photo-current becomes $$i_d = m_d \cos(\omega_{lo} t)[P_{lo}(1 + m_l \cos(\omega_{rf} t)) + P_b]$$

where $m_l$ is the laser modulation index. After expansion, this equation becomes $$i_d = \frac{1}{2} P_{lo} m_d m_l \cos(\omega_{lo} - \omega_{rf}) t +$$
$$(P_{lo} + P_b) m_d \cos(\omega_{lo} t) + \frac{1}{2} P_{lo} m_d m_l \cos(\omega_{lo} + \omega_{rf}) t.$$

For adequate bypassing of the detector output, the second and third terms average to zero, thus the mean laser power and the solar background power do not generate a dc offset at the detector's transimpedance amplifier. This automatic rejection of the solar background power reduces the amount of dynamic range required in the transimpedance amplifier. The desired output of the mixing process is the first term which is a sinusoidal waveform at the frequency difference between the LO and laser modulation. If a frequency chirp is applied to the laser modulation and the detector LO voltage with some relative time delay τ, the detector output is the IF waveform at $f_{if}$ as previously described.

One example of a MSM detector design was made with a semi-insulating GaAs substrate and used evaporation and lift-off to deposit the metal electrodes in a inter-digitated finger pattern. The metalization consisted of 30 nm Ti, 30 nm Pt, and 250 nm Au from bottom to top. The metalization pattern consisted of two, parallel, 100 $\mu$m by 240 $\mu$m bonding pads, separated by 250 $\mu$m. Connected to each pad were interleaved 240 $\mu$m long fingers with width of d1 spaced so that the separation between fingers from opposing pads was d2. Detectors were made with the value of d1 equal to 3 $\mu$m and the value of d2 equal to 3, 5, 9, and 12 $\mu$m. These samples were cleaved from the chip, epoxied into various chip carriers, and tested to measure the effect of finger spacing on detector performance.

When laser light is incident on the exposed semiconductor material between the electrodes, photo-generated charge carriers are created. The amount of these charge carriers that travel toward and are collected by the electrodes, and thus contribute to the current at the outlet electrode, is proportional to the voltage across the detector electrodes. This proportional effect is a voltage-variable responsivity for the detector. When the chirp modulation voltage is applied across the detector electrodes, the responsivity of the detector varies in accordance with the chirp modulation and allows the detector to convert the chirp modulated laser light signal into an IF current signal that contains the range information to the respective target pixels.

The measured dark current at 5 V bias for the detectors with 3-$\mu$m fingers and 9-$\mu$m (eg., 3-9 detector) and 12 $\mu$m spacings is approximately 50 pA; for the 3-$\mu$m fingers and 3-$\mu$m (eg., 3-3 detector) and 5-$\mu$m spacings however the measured dark currents approached 1 nA. Dark current is a measured condition where a voltage bias is applied to the detector and the resulting current is measured under dark conditions. The low dark currents are required to reduce the presence of shot noise that will obscure the ladar target returns. The difference in dark current measurements between the smaller and larger spaced detectors could be caused by processing imperfections.

Low frequency responsivity measurements for all of the detector configurations behave as shown in the measurement for the 3-3 detector, as shown in FIG. 9, where the responsivity of the detectors increases with absolute voltage levels. In general the responsivity is symmetric about zero voltage which, as mentioned, is a desirable attribute for the self-mixing detectors.

Figure 12:
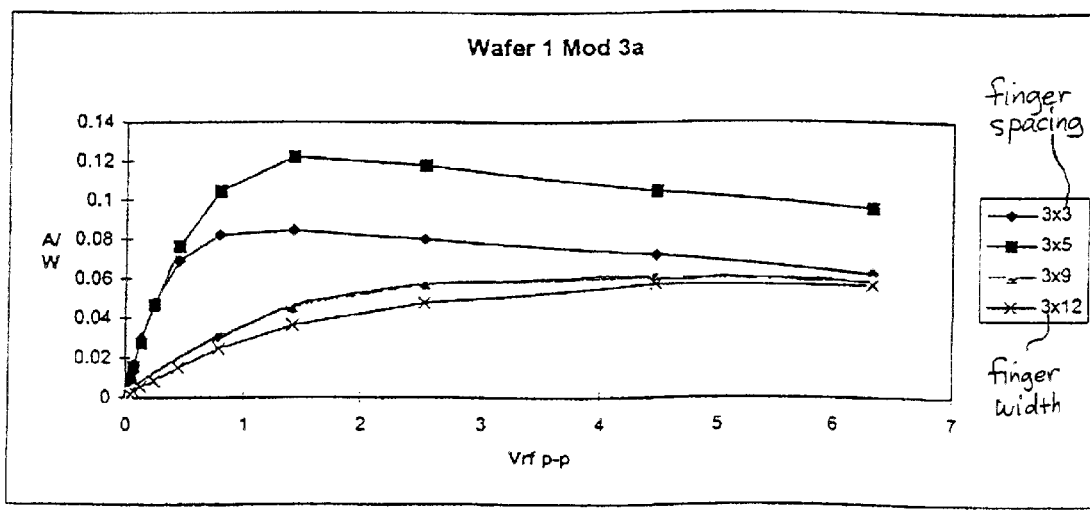
FIG. 12 is a diagram of the responsivity versus local oscillator voltage and detector configuration.

The self-mixing performance of the MSM detectors is measured by embedding the detector in the bias circuit shown in FIG. 8. FIG. 8 shows a particular circuit where the LO voltage is applied to one terminal of the MSM detector that is terminated with a 50-ohm resistor, while the other terminal is AC bypassed to ground with the 18 pf capacitor. The IF signal is recovered from the bypassed terminal. The 18-pF capacitor and the 0.47-$\mu$H inductor prevent the LO voltage from coupling into the preamplifier. A current preamplifier is used to convert the photo-current into a voltage. Responsivity measurements with modulated LO and laser signals were performed using a setup that emulated the setup of the ladar system shown in FIG. 11. Here the laser modulation and LO frequencies were approximately 100 MHz and the frequency difference between the two signals were approximately 200 Hz. The received optical power was calculated to be approximately 9 nW. The IF signal was measured as a function of LO voltage for each of the MSM detectors. FIG. 12 shows detector responsivity versus the peak-to-peak LO voltage for the various detector configurations. The 3-3 and 3-5 detectors had the highest responsivity, with the maximum occurring at a peak-to-peak LO voltage around 1.5 V. The value for the mixed responsivity for the 3x3 detector is 0.12 A/W which is one-half it's DC responsivity; this loss is consistent with the mathematical analysis. Responsivities on this order are useable for the FM/cw ladar. The 3-3 and the 3–5 devices were both observed to detect a DC component of the laser power at the responsivity peak, however. This is probably caused by some small asymmetry of the responsivity curve in FIG. 9.

High optical sensitivity to low optical signals is an important detector parameter for useful ladar performance. We measured the optical sensitivity of the 3-3 detector using the previous setup with the peak-to-peak LO voltage fixed at 1.4 V and the detector amplifier bandwidth set at 1 kHz. The laser power was decreased using calibrated neutral density (ND) filters placed in the laser beam until the IF signal level equaled the noise level. At this point, the optical power was 50 pW. Detector sensitivities at this level in a 1 kHz bandwidth are adequate for a number of ladar applications.

IF bandwidth is an important measure of detector performance when used in a ladar application. Measurements using wideband transimpedance amplifiers yielded IF bandwidths out to 500 kHz. This performance is also adequate for a variety of ladar applications. The LO/illumination bandwidth was essentially flat to 700 MHz which is again sufficient for a wide variety of ladar applications.

Figure 13:
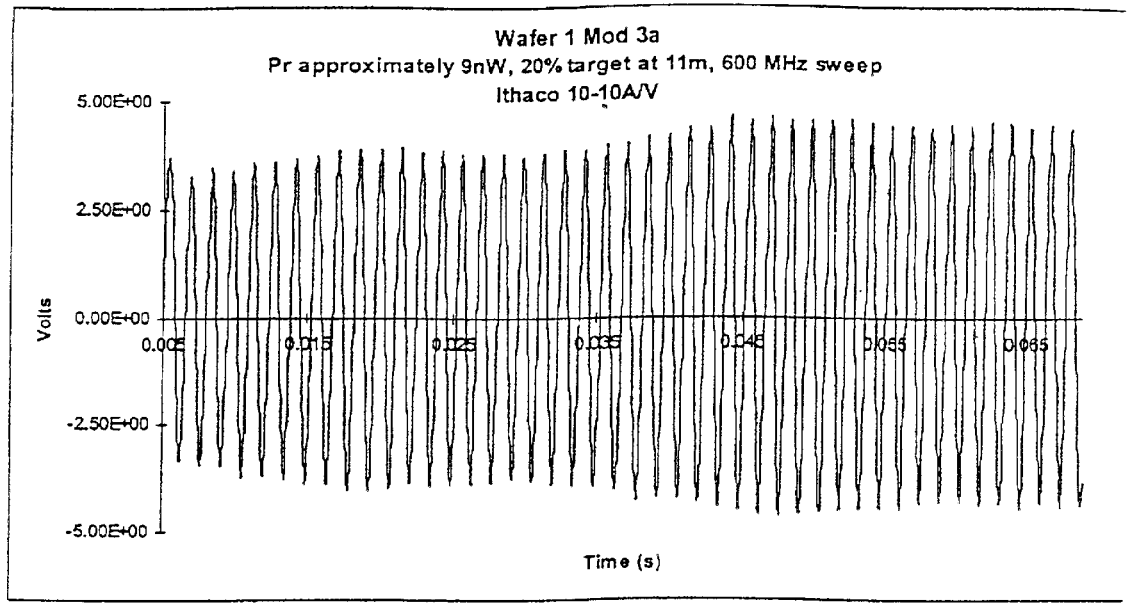
FIG. 13 is an IF waveform recovered from a self-mixing detector of the present invention.

An important validation of the MSM detector for FM/cw ladar operation is the quality of the IF signal when tested in a set-up emulating the ladar architecture of the present invention.. An example of the IF signal for a 3-5 MSM detector is shown in FIG. 13 where the peak-to-peak LO voltages was set to 1.4 V and the chirp generator was set to start at a frequency of 100 MHz and stop at 700 MHz. Ideally the amplitude of the IF signal should remain constant over the chirp bandwidth. For this detector, the IF signal amplitude varied about 30% which is acceptable for most FM/cw ladar applications. Additionally, most of this variation is probably caused by poor layout of the LO drive circuit and can be corrected with some effort. Another requirement for proper FM/cw ladar performance is low levels of "self clutter" in the IF signal. These signals are usually caused by imbalances in the detector impedance to positive and negative LO voltages and are manifested as a slowly varying offset of the mean IF signal. Here the mean level remains flat across the chirp bandwidth, demonstrating that the MSM detector does not generate a significant "self-clutter" signal.

It should be understood that the foregoing description is only illustrative of the invention and that various alternatives and modifications can be made by those skilled in the art without departing from the principles and concepts of the invention. Accordingly, the present invention is intended to encompass all such alternatives, modifications, and variations which fall within the appended claims.

REFERENCES

1. B. L. Stann et al., "Line imaging ladar using a laser-diode transmitter and FM/cw radar principles for submunition applications", SPIE AeroSense
2. W. C. Ruff et al., "Self-mixing detector candidates for an FM/cw ladar architecture", SPIE AeroSense
3. P. Shen et al., "Interdigitated finger semiconductor photodetector for optoelectronic mixing", SPIE AeroSense

What is claimed is:

1. A high range-resolution ladar, comprising:
    a chirp generator for generating a chirp waveform;
    a bias tee coupled to the chirp generator, a DC current source, and a semiconductor laser diode, the bias tee summing the chirp waveform with the DC current source to provide a current drive for the semiconductor laser diode with a bandwidth at least equal to the chirp waveform;
    the semiconductor laser diode coupled to the bias tee, for receiving the current drive and for outputting a light signal toward a target; and
    a self-mixing detector coupled to and driven by the chirp generator, where the responsivity of the detector is varied in accordance with the chirp waveform for converting the reflected light signal received from the target to an electrical signal and for mixing the converted electrical signal with the chirp waveform to produce an output electrical signal whose frequency is proportional to the range to the target.

2. The high range resolution ladar of claim 1, wherein the self-mixing detector comprises at least one detector having a substrate, a first set of electrodes deposited on the substrate, and a second set of electrodes deposited on the substrate and spaced from the first set of electrodes, wherein the first set of electrodes is connected to the chirp generator and the second set of electrodes is connected to the a memory for storing a plurality of frames of image data.

3. The high range resolution ladar of claim 2, wherein the self-mixing detector comprises a plurality of detectors arranged in a two dimensional array.

4. A high range-resolution ladar comprising:
    a chirp generator for generating a chirp waveform;
    a bias tee coupled to the chirp generator, a DC current source, and a semiconductor laser diode, the bias tee summing the chirp waveform with the DC current source to generate a current drive for the semiconductor laser diode;

the semiconductor laser diode coupled to the bias tee for receiving the current drive and for producing an output light signal toward a target; and a self-mixing detector coupled to and driven by the chirp generator, where the responsivity of the detector varies in accordance with the chirp waveform for receiving and mixing a reflected signal from the target with the chirp waveform to output an electrical signal whose frequency is proportional to the range to the target.

5. The high range-resolution ladar of claim 4, wherein the modulated electrical signal comprises a product of the reflected light signal from the target and the chirp waveform, the modulated electrical signal having a difference frequency signal whose frequency is proportional to range to the target.

6. The high range-resolution ladar of claim 5, further comprising:

a wideband RF power amplifier, coupled to the chirp generator, for receiving and modulating the chirp waveform and outputting an amplified chirp waveform for summing in the bias tee.

7. The high range-resolution ladar of claim 6, further comprising:

an impedance matching circuit, coupled to the wideband RF amplifier, for matching the driving impedance of the wideband RF power amplifier to the semiconductor laser diode over a range of the amplified chirp signal frequency such that light beam intensity from the semiconductor laser diode is highly amplitude modulated (AM) and the peak intensity of the light signal is constant as a function of chirp frequency.

8. The high range-resolution ladar of claim 4, wherein the self-mixing detector comprises a plurality of detectors arranged in an array.

9. The high range ladar of claim 8, wherein each detector comprises a substrate, a first set of electrodes deposited on the substrate, and a second set of electrodes deposited on the substrate and spaced from the first set of electrodes.

10. The high range ladar of claim 9, wherein the substrate is formed of a semiconductor material and the first and second sets of electrodes are metal.

11. The high range ladar of claim 10, wherein the semiconductor substrate material includes gallium arsenide.

12. The high range-resolution ladar of claim 4, wherein the self-mixing detector comprises at least one detector, wherein each detector comprises a substrate, a first set of electrodes deposited on the substrate, and a second set of electrodes deposited on the substrate and spaced from the first set of electrodes, and wherein the substrate is formed of a semiconductor material and the first and second sets of electrodes are metal.

13. The high range-resolution ladar of claim 4, further comprising:

a trigger circuit for generating a trigger signal that triggers and synchronizes the chirp generator and the self-mixing detector.

14. The high range-resolution ladar of claim 4, further comprising:

a memory, coupled to the self-mixing detector, for storing a plurality of frames of image data.

15. The high range-resolution ladar of claim 14, further comprising:

computing means, coupled to the memory, for performing a discrete fourier transform on the plurality of frames of image data and outputting results of the discrete fourier transform as a 3-D image file.

16. The high range resolution ladar of claim 4, wherein the self-mixing detector comprises a substrate, a first set of electrodes deposited on the substrate, and a second set of electrodes deposited on the substrate and spaced from the first set of electrodes, wherein the first set of electrodes is connected to the chirp generator and the second set of electrodes is connected to the a memory for storing a plurality of frames of image data.

17. A self mixing detector for use with a ladar system including a chirp generator for generating a chirp waveform, a DC current source, a semiconductor laser diode, and means coupled to the chirp generator and the DC current source and the laser diode to provide a current drive for the laser diode to produce an output light signal directed toward a target, comprising:

a detector coupled to and driven by the chirp generator, where the responsivity of the detector is varied in accordance with the chirp waveform for converting reflected light signals received from the target to an electrical signal and for mixing the converted electrical signal with the chirp waveform to produce an output electrical signal whose frequency is proportional to the range to the target.

18. The self mixing detector of claim 17, wherein the light signal is one of the group of ultraviolet, visible, near infrared, and infrared light.

* * * * *